Sept. 9, 1958     W. D. TEAGUE, JR     2,850,975
ACCELERATION PRESSURIZED BI-PROPELLANT LIQUID FUEL ROCKET
Filed May 27, 1954
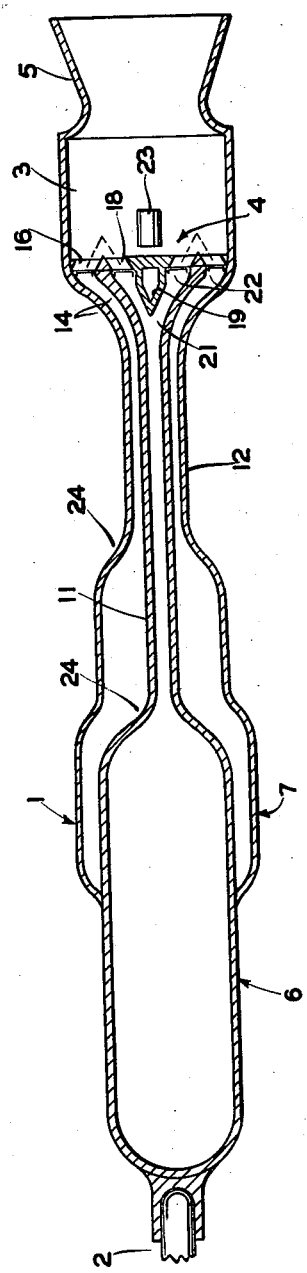
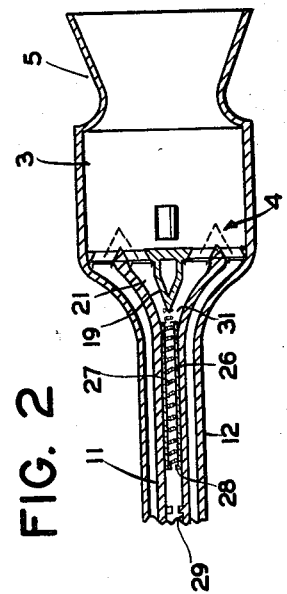
INVENTOR.
WALTER D. TEAGUE JR.
BY
ATTORNEY

United States Patent Office
2,850,975
Patented Sept. 9, 1958

2,850,975
ACCELERATION PRESSURIZED BI-PROPELLANT LIQUID FUEL ROCKET

Walter D. Teague, Jr., Alpine, N. J., assignor to Bendix Aviation Corporation, Teterboro, N. J., a corporation of New Jersey Application May 27, 1954, Serial No. 432,708

8 Claims. (Cl. 102—49)

The invention relates to new and useful improvements in liquid propellent rocket engine systems. It is particularly concerned with an acceleration pressurized liquid propellant rocket engine system and a method of operating the same.

A basic feature of the present invention is found in the simplified structure of the rocket engine system and in the novel manner in which it operates. This simplification is a result of eliminating the methods heretofore employed in pressurizing the propellant, and instead, utilizing a simpler method. Heretofore, propellant pressurization had been accomplished by stored gas with a regulator, burning of a separate powder grain, by pumping means, a gas generator, or other relatively complicated methods. These methods and their associated structures have been eliminated. In the present invention, the propellant is pressurized by the force of inertia developed upon acceleration of the rocket.

The rocket embodying the invention incorporates means for an initiating thrust by a booster charge, whereby either hypergolic or non-hypergolic propellants may be utilized, and the need of a staging mechanism in the injector system is thereby avoided.

A further feature of the invention is found in the design characteristics of the rocket for controlling propellant flow to the combustion chamber, whereby the pressure of the latter and consequent thrust of the engine may be controlled.

The invention finds particular use with respect to liquid bi-propellant rocket engines, though it may also be used in a simpler form with mono-propellant engines.

In bi-propellant engines the invention provides an advantage for design and arrangement whereby the propellants may be progressively consumed and used up at substantially the same time.

A further feature of the invention is that it permits a tankage arrangement of the propellants so that desired injector upstream pressures may be maintained during propelled flight and, hence, provide a desired combustion chamber pressure and thrust.

The nature of the invention is such that it particularly lends itself to short burning time and relatively high thrust to weight ratio rockets.

An object of the invention is, therefore, new and useful improvements in liquid propellant rocket engine systems.

A further object of the invention is an acceleration pressurized liquid bi-propellant rocket.

A still further object of the invention is to provide a pressurized liquid propellant rocket engine system that eliminates pressurization of the propellant by stored gas with a regulator, burning of a separate powder grain, by pumping means, or by other complicated methods.

A still further object of the invention is to provide an acceleration pressurized propellant rocket engine in which may be used either hypergolic or non-hypergolic propellants and wherein the need of a staging mechanism in the injector is unnecessary.

Another object of the invention is a tankage arrangement of propellants in an acceleration pressurized bi-propellant liquid fuel rocket, so that desired injector upstream pressures may be maintained during propelled flight; and A further object of the invention is means for controlling propellant flow to the combustion chamber in a liquid propellant rocket engine.

The foregoing and other objects and advantages of the invention will appear more fully hereinafter from a consideration of the detailed description which follows, taken together with the accompanying drawings, wherein an embodiment of the invention is illustrated. It is to be expressly understood, however, that the drawings are for purposes of illustration and description, and are not to be construed as defining the limits of the invention.

In the drawings:

Fig. 1 is a view of a rocket engine in simplified form embodying the invention; and Fig. 2 is a detail view of a form of the invention employing fuel flow mechanical control means.

In describing the invention in detail, reference is directed to the accompanying drawing, particularly Fig. 1, wherein there is illustrated a rocket shell including in linear arrangement a contained supply of liquid propellant in the body portion 1 of the shell, a suitable warhead 2 mounted in the forward end of the shell, and a combustion chamber 3 in the tail end of the shell in communication with the propellant supply through a suitable injector head 4. The combustion chamber is provided with an expansion nozzle or throat 5 which exhausts the gases of combustion to the outside.

Propellant fluid is fed to the combustion chamber through the injector head by inertia pressurization created in the acceleration of the rocket. The propellant supply may be either of the mono-propellant type or of the bi-propellant type.

Here a rocket utilizing a bi-propellant supply is illustrated, and separate propellant supplies are provided, one of which is a suitable liquid fuel which may be aniline, and the other of which is a suitable liquid oxidizing propellant, which may be nitric acid for mixing with the other in the combustion chamber. The separate propellants are each confined in suitable concentric chambers or tanks 7 and 6 forming the body portion of the rocket, tank 6 containing the fuel propellant, and tank 7 the oxidizer. Each tank has an elongated cylindrical enlarged body and each is preferably of constant cross-sectional area throughout. The warhead 2 extends axially forward from the shell.

Connecting each tank to the injector head is an elongated relatively narrow tube, 11 and 12 respectively. The tail ends of the tubes of both tanks flare concentrically outward to aid in pressure recovery, as at 14, to connect with the injector head 4. The injector head is provided with a circular body portion which walls the combustion chamber off from both tanks. The injector body is provided with a plurality of injector nozzles 16 about its marginal portion communicating propellant tank 7 with the combustion chamber, and is provided with a plurality of neighboring nozzles 18 that communicate tank 6 with the combustion chamber. Extending axially from the body of the injector into the flared portion of the connecting tube of tank 6 is a conical piece 19 which is in close spaced relation to the wall of the flared portion of tube 11 so as to provide a narrow annular passage 21 from the connecting tube to the injector nozzles. The nozzles serving the tanks may be disposed through the injector head in such manner that the fluids issuing from the tanks impinge against one another in the injector chamber and thoroughly mix for ignition.

The tanks are preferably sealed by suitable blow plugs to prevent fuel flow through the injector nozzles to the combustion chamber. While these may take a variety of forms, they are indicated as rupturable diaphragms 22. The diaphragms may be ruptured in any suitable manner. The tankage could be pressurized for starting purposes only in any suitable manner whereby the diaphragms would rupture under the increased pressure. This could be done by igniting, by squib or otherwise, a solid fuel powder grain 23 properly positioned in the combustion chamber and using a closed tube launcher. The burning gases formed build up a chamber pressure which not only provides an initial thrust to launch the rocket but also causes rupture of the diaphragms and escape of the propellants through the injector nozzles into the combustion chamber. In the latter, the propellants ignite and provide increased chamber pressure and thrust in propelling the rocket into space. The propellants are, after rupture of the diaphragms, fed to the combustion chamber through the injectors by inertia pressurization created in the acceleration of the rocket.

Use of the burning solid fuel in the combustion chamber is of advantage in that it eliminates the need of a staging mechanism in the injectors. The burning solid propellant serves to prepare the combustion chamber for ignition of the propellants issuing from the tanks. This is of further advantage in that either hypergolic or non-hypergolic propellants may be used.

The volume of each tank is proportioned to the other so as to provide a proportioned supply of both propellants for a desired mixture flow through the connecting tubes and injectors to the combustion chamber.

It is desired that the fluid column pressure will be the same for each propellant throughout rocket flight, and that the one will not vary with respect to the other at any instant of flight as the propellants are progressively consumed. To this end the fluid column height of the propellants, taking into consideration the specific gravity of each, are proportioned to each other to provide the same fluid column pressure through the injectors. So that this proportioned fluid column height of the one propellant with respect to the other will not vary as the propellants are progressively consumed during rocket flight, the cross-sectional area of each tank is constant throughout and the column pressure of the propellant in one tank is equal to that in the other. By this arrangement the tanks will progressively empty as the propellants are used up in flight, and the pressure flow of each propellant through the injectors will be the same for each, without the one varying from the other at any point in flight. Further, a constant thrust will be maintained throughout flight. The tank configuration is arranged so that the increase in acceleration with the desired constant thrust is compensated by the decreased fluid column so as to maintain constant injector pressure and thrust.

Thrust trail-off is minimized by adding an effective approach radius from the tanks at 24 to the connecting tubes and by providing a suitable large recovery section at 14 to the injectors. The limited volume of propellants that will be left in the connecting tubes after the tanks have emptied is intended to be negligible, providing relatively efficient propulsion.

It should be clear from what has been indicated, that the design characteristics of the rocket may be chosen so that the rocket unit will stabilize out around a design thrust value for given lengths of the tanks and connecting tubes relative to the total weight of the rocket inclusive of the weight of the propellants, providing suitable initial acceleration is imparted. In this design arrangement, the column height of the propellants will decrease in fixed ratio to the total weight of the rocket as the propellants are consumed, the weight of the rocket structure remaining constant.

An increase in specific gravity of the fuel will permit reduction of overall length of the rocket.

Reduction in weight of the warhead or booster body will increase acceleration and final velocity and, hence, will allow a decrease in the length of the rocket.

One of the basic advantages provided from the simplified rocket arrangement of the present invention is the elimination of the propellant pressurizing system, heretofore accomplished by stored gas with a regulator, by pumping means, by burning of a separate powder grain to increase the pressure of the propellants, and by other complicated methods.

It is also to be noted that due to the design structure of the rocket the propellants are progressively used up and the tanks emptied at substantially the same time, whereby a conservation of propellants, among other advantages mentioned above, is provided.

Other means besides design structure in a rocket of this nature may be provided for controlling the chamber pressure and consequent thrust. This may be provided by mechanical means controlling fuel flow, as disclosed in Fig. 2, wherein a sleeve 26 surrounding a coil spring 27 is slidable in the connecting tube 11 of tank 6. The spring is retained in the sleeve by an axially apertured wall 28 at the forward end of the sleeve. Sleeve 26 is limitable in any forwardly sliding movement by an internal shoulder 29 of the tube. The spring extends at 31 slightly beyond the rear end of the sleeve and is adapted to axially receive the tip of the injector head cone 19. In the operation of the rocket, fuel flow from tank 6 is through the sleeve and between the coil turns 31 at the projecting end of the spring to the passage 21 and the injector nozzles. Now, should the presure drop through orifice 28 exceed the spring load during the acceleration of the rocket, the spring compresses against the conical nose and the sleeve slides further rearward to constrict the fuel passage 21 to the injectors. Upon engagement of the end of the sleeve over the conical nose, the passage closes. By this arrangement, and as a consequence, a control over the chamber pressure and thrust of the rocket is provided.

Although the invention has ben illustrated and described in detail as above, it is to be expressly understood that the invention is not limited thereto. Various changes can be made in the design and arrangement of the parts without departing from the spirit and scope of the invention, as the same will now be understood by those skilled in the art.

I claim:

1. In a rocket engine, liquid propellant tankage comprising a plurality of concentric propellant tanks wherein the columetric fluid presure of the propellant filling one tank is the same as that of the other, a combustion chamber, means sealing the propellants in the tankage, orifice means communicating the tankage to the combustion chamber and a temporary operating means for both removing the sealing means to open communication of the propellants with the combustion chamber and providing an initial acceleration thrust to the engine, the propellants caused to flow to the combustion chamber through the unsealed orifice means under pressure acting thereon created by force of inertia developed by acceleration of the mass under the initial thrust, and the propellants caused to thereafter continuously feed to the combustion chamber only by force of inertia created by a continuous acceleration of the mass occurring after that of the initial thrust.

2. In a rocket engine system including a combustion chamber, a tank containing a liquid fuel propellant, a second tank concentric with the latter tank and containing a liquid oxidizing propellant, the propellant of one tank having a specific gravity different from that of the other tank and the ratio of the length of one tank to the other and to the specific gravity of the propellants being such that the columetric fluid pressure of the propellant filling one tank is equal to that of the other injectors for separately communicating the propellants to the combustion chamber, the injectors directed for impinging the fluids against one another in emitting them to the combustion chamber, means for blocking the flow of the propellants to the injectors, and means for releasing the blocking means to permit flow of the propellants through the injectors, the propellants adapted to combust upon mixing and to provide acceleration to the rocket, and the propellants upon acceleration of the rocket caused to be fed to the combustion chamber only by pressure thereon created by the inertia force of the mass.

3. In a rocket engine as in claim 2, wherein means is provided for controlling the flow of the fuel propellant to the injectors, the means comprising a fixed valve seat projecting from the injectors axially into the exit end of the fuel tank, a sleeve closure within the tank slidable over the valve seat to close the opening, and spring loaded means between the sleeve closure and the valve seat adapted to normally hold the closure free of the valve seat, the closure means adapted to exert a pressure force upon the spring upon acceleration of the rocket mass and adapted to slide over the valve seat to close the opening in the fuel tank to the injectors upon the pressure force overcoming the spring load.

4. In a rocket engine including a combustion chamber, a liquid fuel tank including an opening in its end for communicating liquid propellant to the combustion chamber, a fixed valve seat positioned axially in the opening in spaced relation to the wall thereof, sleeve closure means slidable in the opening over the valve seat to close the opening, loaded spring means between the closure means and the valve seat adapted to normally hold the closure means free of the valve seat, the closure means adapted to exert an inertia force upon the spring upon acceleration of the rocket engine mass and adapted to slide over the valve seat to close the opening to the combustion chamber upon the pressure for overcoming the spring load.

5. A rocket engine system comprising an elongated liquid propellant fuel supply tank including an elongated tail portion of narrow diameter and of constant cross sectional area throughout and an elongated axially extending forward portion of greater diameter and of constant cross sectional area throughout, a warhead mounted axially in the forward end of the fuel tank, the tail portion terminating in a funneled open end, a combustion chamber, wall means walling the combustion chamber off from the funneled end of the fuel tank, and injector perforations in the wall means communicating the funneled end of the tank with the combustion chamber, the combined length of the tail portion and the forward portion providing a column height for a fuel supply therein that decreases with flow through the injector perforations in a fixed ratio to the total weight of the rocket inclusive of the weight of the fuel supply.

6. In a rocket engine as in claim 5, wherein a second elongated liquid propellant supply tank is provided concentrically surrounding the first-mentioned tank, a substantial part of the forward portion of the first tank extending beyond a tapering forward terminating wall of the second tank, the cross sectional area of the second tank being constant throughout, and also including an elongated tail portion concentric with the tail portion of the first tank and of constant cross sectional area throughout, the tail portion of the second tank terminating in a funnel open end concentric with that of the first tank, the wall means also walling the combustion chamber from the second tank, and separate injector perforations in the wall means communicating the funneled end of the second tank with the combustion chamber, the separate injector perforations for the tanks being directed through the wall means to a common point within the combustion chamber, the separate combined length of the tail portion and the forward portion of each tank providing in each a column height for the fluid supply therein that decreases with flow through the injector perforations in a fixed ratio to the total weight of the rocket inclusive of the weight of the fluid in each tank.

7. In an acceleration pressurized rocket of the character described including a warhead, a pair of concentric propellant supply tanks to the rear of the warhead, a combustion chamber having a nozzle exhaust and an injector head, a pair of relatively narrow concentric tubes, each connecting a propellant tank with the injector head, each tank providing a fluid column pressure through the injector head to the combustion chamber equal to that of the other, and each tank having a constant cross-sectional area whereby the column pressure of the one propellant with respect to the other does not vary as the propellants are progressively used up, and the narrow tubes each connecting with the injector head through a large recovery section whereby trail-off rocket flight is minimized upon emptying of the tanks.

8. In an acceleration pressured rocket including a war head projecting axially from the forward end thereof, a pair of concentric propellant supply tanks extending axially to the rear of the war head, each tank having a constant cross sectional area throughout, a combustion chamber including an injector head defining one end thereof and an exhaust nozzle axially extending from the opposite end, a pair of relatively narrow concentric tubes each axially connecting a particular tank to the injector head, each connecting tube having a large recovery terminal end at the point of connection with the injector head, the injector head having a plurality of rupturable diaphragm sealed perforations communicating the terminal end of each connecting tube with the combustion chamber, the cross sectional area of each tank being constant throughout, the cross sectional area of each connecting tube being constant throughout and constant in the terminal portions thereof, and the columetric pressure of a particular propellant filling one tank and its connecting tube being equal to the columetric pressure of a particular propellant filling the other tank and its connecting tube, and the perforations through the injector head relative to one tank proportioned to those relative to the other tank to provide a fixed volume flow of one propellant relative to the other to the combustion chamber.

References Cited in the file of this patent

UNITED STATES PATENTS

| | | |
|---|---|---|
| 2,496,710 | Goddard | Feb. 7, 1950 |
| 2,536,597 | Goddard | Jan. 2, 1951 |
| 2,667,740 | Goddard | Feb. 2, 1954 |

FOREIGN PATENTS

| | | |
|---|---|---|
| 276,911 | Italy | Aug. 22, 1930 |
| 272,168 | Switzerland | Feb. 16, 1951 |